United States Patent [19]

Wheeler

[11] 3,852,902
[45] Dec. 10, 1974

[54] PORTABLE SIGN CONSTRUCTION
[76] Inventor: Alton D. Wheeler, 3940 Fox Meadow, Pasadena, Tex. 77502
[22] Filed: Jan. 18, 1973
[21] Appl. No.: 324,677

[52] U.S. Cl............ 40/129 R, 40/125 H, 40/125 N, 40/145 A
[51] Int. Cl............................................. G09f 21/04
[58] Field of Search .......... 40/129 R, 129 C, 129 B, 40/125 R, 125 N, 125 H, 138, 145 A, 145 R, 33, 39, 40, 37.1; 340/129, 133, 145, 84, 87, 90, 107, 109

[56] References Cited
UNITED STATES PATENTS

| 814,383 | 3/1906 | MacArthur | 40/33 |
| 1,175,841 | 3/1916 | Taylor | 40/33 |
| 1,565,285 | 12/1925 | Merker | 40/138 |
| 1,726,817 | 9/1929 | Franklin | 40/145 A |
| 1,856,349 | 5/1932 | Bigelow | 40/125 H X |
| 2,564,170 | 8/1951 | Nusbaum et al. | 40/125 N X |
| 3,622,980 | 11/1971 | Elledge | 40/129 C |
| 3,702,033 | 11/1972 | Coleman | 40/129 R |

FOREIGN PATENTS OR APPLICATIONS

| 576,590 | 5/1933 | Germany | 40/129 C |

Primary Examiner—Robert W. Michell
Assistant Examiner—John F. Pitrelli
Attorney, Agent, or Firm—Pravel & Wilson

[57] ABSTRACT

A trailer mounted billboard or display sign mounted on an axle with the sign disposed transverse to the axle during transportation of the sign from place to place and disposed parallel to the axle when positioned for display and further including ballast means carried by the axle to resist tipping of the sign from wind or other forces.

4 Claims, 4 Drawing Figures

PATENTED DEC 10 1974
3,852,902
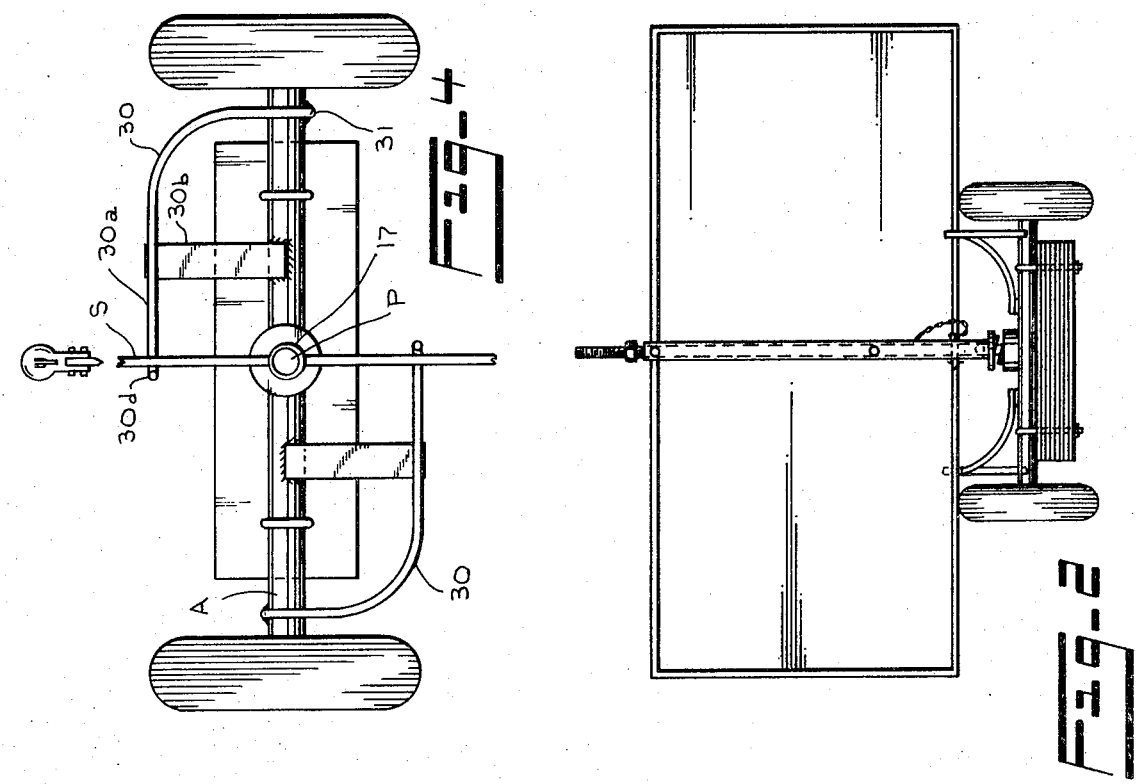
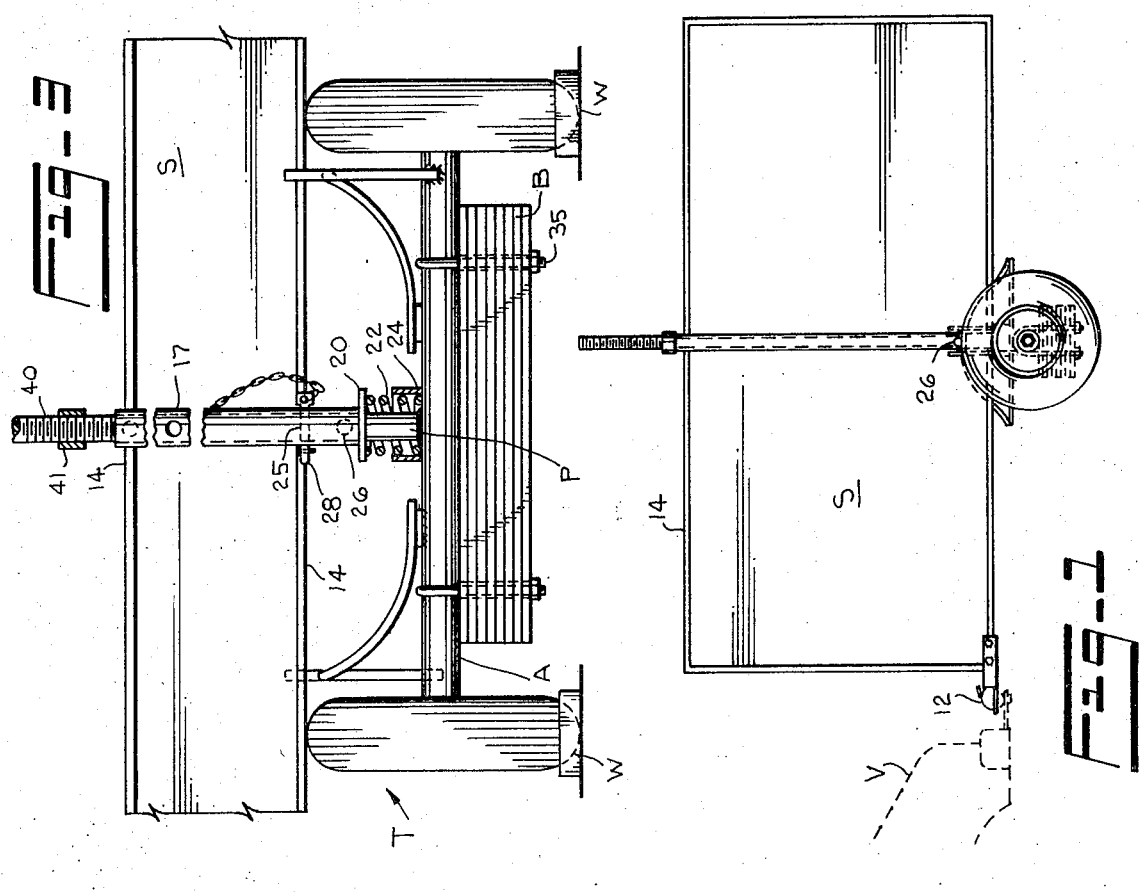

PORTABLE SIGN CONSTRUCTION

BACKGROUND OF THE INVENTION

1. Field of the Invention

The present invention relates to portable or transportable trailer signs which are normally carried on an axle with wheels from place to place and which may be erected or positioned for display as a temporary sign at some desired location.

2. Description of the Prior Art

Heretofore trailer signs or portable signs have normally included some type of carriage device comprising an axle mounted on wheels with the sign permanently affixed to the axle. Heretofore, the sign board has been normally rigidly attached to the axle in a transverse position relative thereto and generally spaced between the wheels of the carriage device. One of the disadvantages of this type of structure is that the wheels tend to obstruct the view of a portion of the sign and further, the ground required to park or position the sign is at least as large as the area defined by the width of the carriage and also by the length of the sign which is positioned on the axle. Thus, with this type of trailer sign, a parking area or space normally the size occupied by an automobile is required in order to accommodate such a sign structure. Thus, trailer signs of this type have the inherent disadvantage of requiring large amounts of space to store in inventory or to display.

Another disadvantage of some of the prior art trailer signs is that they have been found to be very unstable in high winds due to the fact that the large surface area of the sign exposed to the wind causes the fixed axle type of sign to be blown over and damaged in the event of being struck by high gusts of wind.

SUMMARY OF THE PRESENT INVENTION

The present invention provides a trailer mounted sign which occupies a space which may be defined generally by the diameter of wheels on which the sign is carried and the length of the sign structure, which in most instances will be less than one-half of the space occupied by trailer signs which are permanently affixed to a transverse axle.

Further, the present invention includes a ballast means carried by the axle which permits the sign to tip over in response to gusts of wind and which automatically rights the sign when the wind force abates.

BRIEF DESCRIPTION OF THE DRAWINGS

FIG. 1 of the drawings is a side elevation of the trailer sign of the present invention in its towing position;

FIG. 2 is a side elevation of the sign construction of the present invention in its fixed or parked position with the sign board rotated into a position parallel to the axle of the folding carriage;

FIG. 3 is an enlarged view of the structure shown in FIG. 2 showing additional details of the trailer; and FIG. 4 is a plan view showing the sign in a transverse position relative to the axis suitable for towing.

DESCRIPTION OF THE PREFERRED EMBODIMENT

Briefly, the apparatus of the present invention, designated generally T in FIG. 3 of the drawings, comprises a wheel carriage including a fixed axle A having a pair of wheels W rotatably mounted on spindles at the opposite ends thereof with a central post or vertically extending stanchion P extending upwardly from the central portion of the axle A. A sign or display board S is shown mounted on the vertical post P. Such sign board is rotatably mounted on the post P so that it may be aligned either longitudinally along the axle A, as shown in FIGS. 2 and 3, or such sign may be pivoted or rotated into a position transverse to that of the axle A as illustrated in FIGS. 1 and 4 of the drawings.

With the sign board S aligned as shown in FIG. 1 of the drawings, transverse to the axis of the axle A, the forward end 11 of the sign board S is connected by means of a hitch 12 to a vehicle V which is used for towing or pulling the sign about from place to place. The sign S is preferably a rectangular plane surface structure having a reinforcing border or perimeter member 14 extending therearound and, as shown, the hitch 12 is secured to the lower end of the sign structure adjacent its leading end by means of bolts or other suitable securing means.

In the preferred form of the present invention as illustrated in FIGS. 1 and 3, it will be seen that a tubular sleeve member 17 extends vertically upwardly through the mid portion of the sign board S and that the perimeter frame members 14 are secured to opposite sides of such sleeve 17. Such sleeve 17 is provided with a lower flange member 20 which forms an annular shoulder which extends laterally outwardly around the lower end of the sleeve 17 for engaging a spring member 22 which, as shown in FIG. 3 of the drawings, is a coil spring which is positioned so as to surround the lower end of the post P. A sleeve or guard member 24 extends circumferentially of the spring 22 for aligning the spring vertically and holding it in position around the post P.

Also, as shown in FIG. 3 of the drawings, the post P is provided with a transversely extending opening or bore 25 which is normally aligned parallel to the axis of the axle A and also with another transverse opening 26 which is disposed at right angles to the axis of the axle A and is positioned below the opening 25. Similarly, the sleeve 17 is provided with an opening which is aligned with the sign S and which is provided for receiving a locking pin 28 for locking the sign S in a desired position relative to the post P. Thus, it will be appreciated that when the sign is aligned in a plane parallel to the axis of the axle A as illustrated in FIG. 3 of the drawings, the locking pin 28 will be inserted through the openings of the sleeve 17 and corresponding opening 25 in the post P for locking the sign S against rotation relative to its supporting post P. Further, when the sign S is turned transversely of the axle A, as shown in FIGS. 1 and 4 of the drawings, the locking pin 28 is inserted again through the opening in the sleeve 17 and through the openings 26 which extend transversely through the post P. Thus, the sign S can be locked into the position shown in FIG. 4 relative to the post P and the axle A.

Guide members 30 are provided on opposite sides of the post P for protecting the sign while it is in the display position illustrated in FIG. 3 and to assist holding the sign in the transverse position shown in FIG. 4. Bars or guide members 30 are preferably formed of tubing or other suitable rigid material and are connected at their base 31 to the axle A by welding or other suitable means and extend either forward or aft of the axle A as the case may be. Such guard members 30 are curved to position a portion of the guard or bar 30a substantially parallel to the axle A and such parallel portions are secured to the axle by means of a suitable strap or other bracket 30a which is welded or otherwise secured to the axle A. The terminal ends of such guard members 30 are provided with a vertically extending tip portion 30d which is adapted to engage the side of the sign S adjacent thereto.

From the foregoing description of the drawings, it will be appreciated that when the sign S is positioned in the transport position as illustrated in FIGS. 1 and 4 of the drawings, the sign will be lowered so as to align the opening with the opening 26 which will lower the lower end of the sign between the wheels W. By the same token, when the sign S is positioned in its display position, the sign is rotated 90° and lifted so that the lower end of the sign clears the upper side of its wheels W and in this position the opening is aligned with the openig 25 for receiving locking pin or shaft 28.

A balance or ballast B is supported on the axle A by means of suitable U-bolts 35, the purpose of such balance B being to provide a counterweight so as to return the sign to an upright position in the event a gust of wind or other force should tip such sign laterally when in the display position. It will be appreciated that when the sign is in the display position shown in FIG. 3 of the drawings, locked to the post P by means of the locking pin 28, in the event of a lateral force against the face of the sign S, the sign will be tilted sideways with respect to the wheels W. That is, the sign, in the display position, is pivotally mounted between the wheels W with the balance B positioned below the axis of the wheels W and with the sign S above such axis and therefore in order for the lateral force to tip or lean such sign sideways, it will first have to overcome the counteracting force imposed by the ballast B in the event a lateral force of sufficient magnitude is imposed upon the sign S so as to tip it sideways. When such lateral force is abated or removed from the sign S, the counteracting force of the ballast B will automatically return the sign S to its vertical upright position in which it is normally found.

When the sign is in the display position, the wheels are locked against rotation by wheel checks or other suitable means.

Also, as shown in FIG. 3 of the drawings, the lower end of the post P is welded or otherwise rigidly affixed to the axle A and the upper end of such post P is provided with threads 40 for receiving the threaded collar or sleeve 41 which is tightened against the upper end of the sleeve 17 so as to lock the sign S in its preferred position either in the transverse position for travel or in the longitudinally extending position for display.

Also, it will be appreciated that with the apparatus of the present invention a portable or movable trailer sign is provided which does not possess many of the disadvantages of earlier trailer sign structures; mainly, a sign which requires a minimum amount of storage space either in inventory or on location and which, when set up on location provides an automatic arrangement for resisting and overcoming lateral forces which otherwise tend to tip or blow over other trailer or portable sign structures.

The foregoing disclosure and description of the invention are illustrative and explanatory thereof, and various changes in the size, shape and materials as well as in the details of the illustrated construction may be made without departing from the spirit of the invention.

What is claimed is:

1. A portable trailer sign adapted to be moved from place to place and temporarily set up as a display sign comprising:
   a. an axle having a pair of wheels mounted at its opposite ends for rotation with respect thereto whereby said axle is permitted to rotate relative to said wheels when said wheels are stationary;
   b. a vertically extending post rigidly secured to said axle between said wheels;
   c. a sign board mounted on said vertically extending post and means mounting said sign board on said post for movement from a first position perpendicular to said axle to a second position parallel to said axle;
   d. means for holding said sign board in said first position;
   e. means for holding said sign board in said second position, and
   f. ballast weight means depending below said axle and between said wheels to resist rotation of said axle relative to said wheels when said sign board is positioned in said second position.

2. The invention of claim 1 including a tubular member affixed to said sign board and extending from the top to the bottom of said sign board and adapted to be positioned around said vertically extending post for rotatably mounting said sign board thereon.

3. The invention of claim 1 including means adjacent one end of said sign board for connecting said sign to a towing vehicle for moving said sign from place to place.

4. The invention of claim 1 including coil spring means around the base of said vertically extending post for yieldably supporting said tubular member relative to said post.

* * * * *